(12) United States Patent
Pawelski

(10) Patent No.: US 6,234,758 B1
(45) Date of Patent: May 22, 2001

(54) HYDRAULIC NOISE REDUCTION ASSEMBLY WITH VARIABLE SIDE BRANCH

(75) Inventor: Paul C. Pawelski, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/451,553

(22) Filed: Dec. 1, 1999

(51) Int. Cl.$^7$ ...................................................... F04B 49/00
(52) U.S. Cl. ............................................................ 417/26
(58) Field of Search .............................. 417/26, 22, 23, 417/24, 25

(56) References Cited

U.S. PATENT DOCUMENTS

| | | |
|---|---|---|
| 4,067,195 | 1/1978 | Malecha . |
| 4,314,621 | 2/1982 | Hansen . |
| 4,617,962 | 10/1986 | Brunner . |
| 4,642,035 | 2/1987 | Nyquist . |
| 4,671,380 | 6/1987 | Henderson et al. . |
| 4,822,115 * | 4/1989 | Farr ........................................ 303/116 |
| 5,180,298 | 1/1993 | DiRe . |
| 5,182,979 * | 2/1993 | Morgan ...................................... 92/5 |
| 5,205,326 | 4/1993 | Paley et al. . |
| 5,426,270 | 6/1995 | Wheeler et al. . |
| 5,433,514 * | 7/1995 | Tsukamoto et al. .................. 303/113 |
| 5,454,632 * | 10/1995 | Burgdorf et al. ................. 303/115.4 |
| 5,475,976 | 12/1995 | Phillips . |
| 5,492,451 | 2/1996 | Franz et al. . |
| 5,555,726 | 9/1996 | Huebner . |
| 5,560,205 | 10/1996 | Huebner . |
| 5,582,207 | 12/1996 | Gilbert et al. . |
| 5,743,598 * | 4/1998 | Toda et al. .............................. 303/11 |
| 5,791,141 | 8/1998 | Phillips . |

* cited by examiner

Primary Examiner—Teresa Walberg
Assistant Examiner—Vinod D. Patel
(74) Attorney, Agent, or Firm—Blackwell Sanders Peper Martin

(57) ABSTRACT

A variable volume side branch is provided or attenuating fluid noise in a hydraulic system having a fluid pump and includes a variable volume fluid container having a fluid inlet and a fluid outlet. The fluid container is operable to change the volumetric thereof and to thereby attenuate fluid noise in a hydraulic system in response to changes in fluid pump speed. The fluid inlet of the variable volume fluid container is in fluid communication with a fluid pump and control of the fluid container volumetric is accomplished through the use of a speed sensor, a controller and various actuating mechanisms. The speed sensor determines fluid pump speed and transmits a signal indicative thereof to a controller coupled thereto. The controller is operable to receive an input signal from the speed sensor and to output an appropriate signal to the actuating mechanism to change the volumetric length of the fluid container in response to the input signal. This assembly optimally attenuates fluid noise in a hydraulic system which includes the present variable side branch.

22 Claims, 4 Drawing Sheets

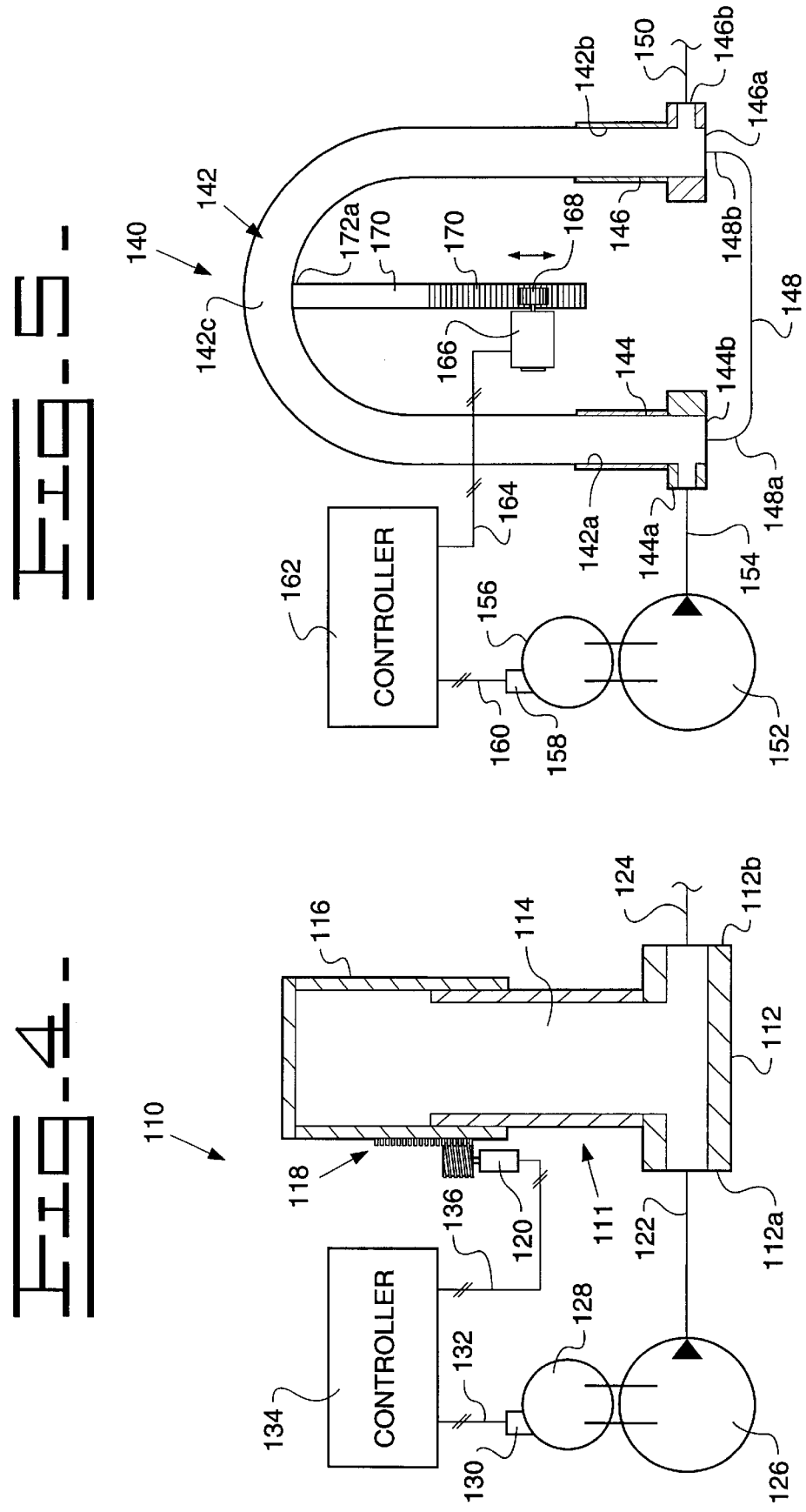

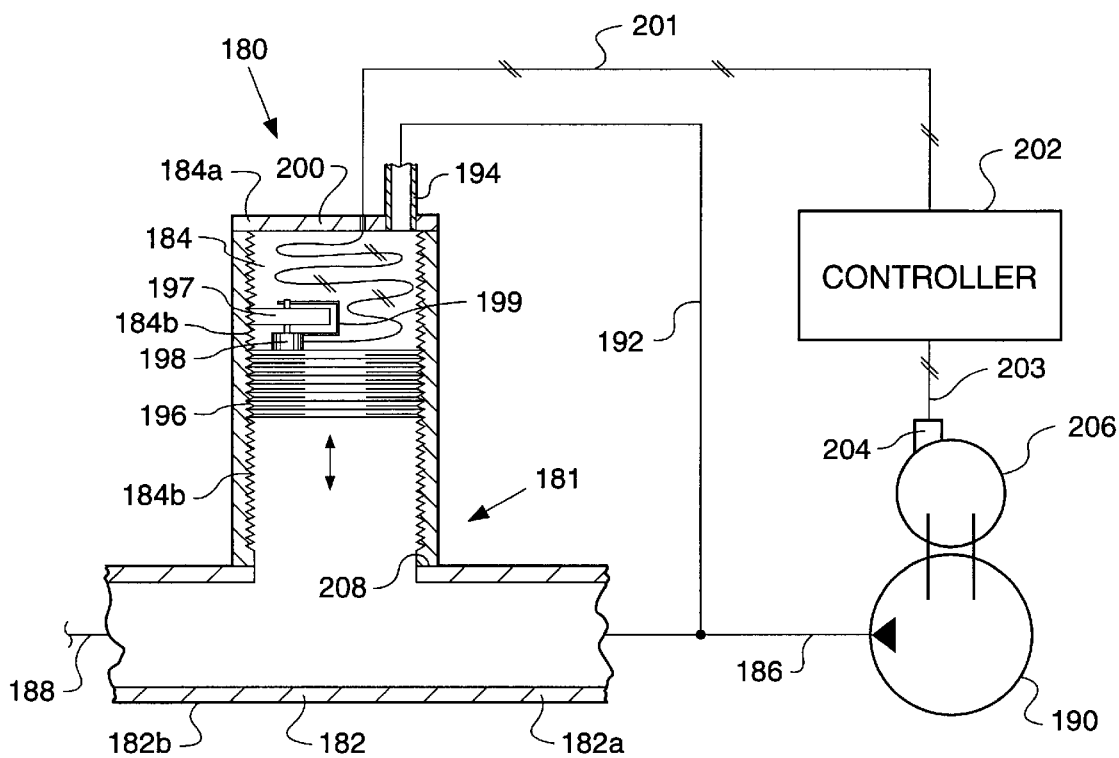

HYDRAULIC NOISE REDUCTION ASSEMBLY WITH VARIABLE SIDE BRANCH

TECHNICAL FIELD

This invention relates generally to hydraulic systems and, more particularly, to an assembly with a fluid conveying side branch that is adapted for varying the volume of the side branch as hydraulic pump speed varies in order to attenuate fluid noise.

BACKGROUND ART

It is well known that power in hydraulic systems is transmitted and controlled by pressurized fluid such as in the use of positive displacement pumps to convert shaft rotation into hydraulic power. Pumping frequency and the harmonics of such processes necessarily create variations in both the flow and pressure being carried by the fluid. These variations cause fluid-borne and structure-borne vibrations to be transmitted throughout the hydraulic system, including the plumbing system associated therewith. These fluid vibrations act as excitation drivers of the system components and become audible (air-borne) noise as vibrations of the component surfaces are transmitted to the surrounding air.

Pressure variation caused by flow variation frequently creates pump (fluid) noise, which becomes more prominent as pressure variation amplitude and frequency increase. Such pump-produced variations or "ripples" in pressure and flow are transmitted through the working fluid as fluid-borne noise which excites the surface of fluid conduits causing airborne noise and providing energy which may in turn excite any structural member or surface to which the conduit is attached. Variations in flow caused by a positive displacement pump are due to periodic variations in geometric displacement and fluid compression and expansion processes at the points of transition between high pressure and low-pressure elements of the system.

Geometric displacement variation, or the ripple effect discussed above, occurs because total flow is a summation of flow from the individual pumping elements. In the case of a piston pump, geometric flow varies as the sum of a series of half sine waves, amplitude of the flow ripple being dependent on the number of pumping elements. Also, the fundamental flow variation frequency for piston pumps matches the first order piston pass frequency. However, in most mobile machines, piston pass frequency varies with machine engine speed (rpm), and because engine speed varies over a wide range, piston pass frequencies will also vary over a wide range. Furthermore, when there is an odd number of pistons, the dominant frequency is normally twice the piston pass frequency.

It is therefore desirable to keep the rate of change in flow as low as possible, avoiding surges of fluid, in order to provide a smooth variation in flow. Avoiding a large amount of fluid flow change minimizes differences in amplitudes of the harmonics of the fundamental frequency. Such minimization in rate of change of flow variation can be controlled by properly controlling the timing of the inlet and outlet ports. Because timing of port (orifice) operation influences a number of other pump characteristics and must accommodate a wide variety of operating conditions, the design of port timing is usually a compromise, which can interfere with obtaining the optimum flow variation for a particular system.

A variety of approaches have been taken to address audible noise attenuation in hydraulic systems where the audible noise is the end result of fluid noise. When attached as a side branch to a pump outlet line, gas-charged accumulators can be used to reduce pulsations. However, they tend to be less effective than flow-through types of accumulators. Accumulators generally are low frequency devices which act to reduce the low frequency components of the pulsations with little effect on the critical mid-frequency components. At high frequencies, intervals between pulsations are so short that there is insufficient time for fluid to enter and exit the accumulator before the next pulse arrives. In such cases, some pulsations bypass the accumulator completely. Construction of a flow-through device can overcome this problem. Flow-through type accumulators are effective at almost all frequencies, however they tend to be bulky and expensive. In addition, gas-charged type accumulators require maintenance (charging to the correct pressure) and such accumulators are temperature sensitive. These limitations prevent gas-charged accumulators from being suitable for use on variable pressure systems.

Other known approaches to fluid noise reduction include the addition of a Helmholz resonator to a hydraulic system. This system requires providing a volume in a side branch of the system. This is accomplished by providing a fluid vessel generally adjacent the pump that has a predetermined length with a flow volume which can absorb and release fluid as the flow variation from the pump tries to suddenly increase and decrease flow through the flow restrictor that is located downstream thereof. Fluid in the volume and its connecting line forms a resonant subsystem in which output pressure pulsations and steady state pressure losses of the Helmholz resonator type muffler are minimal. This provides a more constant flow rate downstream. Thus, a Helmholz resonator can reasonably attenuate pressure pulsations from a hydraulic pump and can have a convenient small volume and simple structure. However, current Helmholz resonators are limited in that they have a fixed, non-adjustable volume and therefore can only provide high attenuation in narrow bands.

Another known approach to the fluid noise problem is the so called Quinke Tube which is an arrangement that splits flow equally between two lines of different lengths and recombines them at a downstream junction. The Quinke device works by effectively canceling the fundamental flow variation frequency and its harmonics because the two flows are out of phase when they merge since they travel different distances. Like the Helmholz resonator, known Quinke tubes have a fixed length and therefore can only provide high attenuation in narrow bands.

A further known approach to the problem of fluid noise being converted to audible noise has been the use of acoustic filters that work like an automotive muffler. Sometimes referred to as "tuned" filters, acoustic filters are as effective as flow-through, gas-loaded accumulators and do not require maintenance. However, acoustic filters must be selected on the basis of pumping frequency and flow capacity. Further, such filters can be bulky and expensive, and because they are also good sound radiators, they must sometimes be wrapped with noise insulation material so that any sound emissions emanating therefrom will not exceed the other reductions that will result from their use. In addition, some tuned filters can only provide high attenuation in narrow bands. Although tuned filters are sometimes used with a combination of other devices to broaden the tuning over a wider range, combining devices necessarily increases the bulk and cost of the entire system.

It is therefore desirable, to provide a system that is effective to control the fluid borne noise within a hydraulic system when operating at different speeds, different pressures, and/or different displacements.

Accordingly, the present invention is directed to overcoming one or more of the problems as set forth above.

DISCLOSURE OF THE INVENTION

With the above shortcomings of the known art in mind, a side branch adaptation to a hydraulic pumping system, which branch can be varied in volume or length as hydraulic pump speed increases and decreases, provides high attenuation of fluid-borne noise over a broad band and thus provides better attenuation in a wider variety of situations. Accordingly, the present invention teaches the construction and operation of several embodiments of a system which provides a substantial useful improvement over known hydraulic noise cancellation systems.

In one aspect of the present invention a variable volume side branch for attenuating fluid noise in a hydraulic system having a fluid pump includes a variable volume fluid container having a fluid inlet and a fluid outlet. The fluid container is operable to change the volume thereof and to thereby attenuate fluid noise in a hydraulic system in response to changes in fluid pump speed. The fluid inlet of the variable volume fluid container is in fluid communication with a fluid pump and a speed sensor determines fluid pump speed and transmits a signal indicative of fluid pump speed to a controller coupled to the speed sensor. The controller is operable to receive an input signal from the speed sensor and to output an appropriate signal to initiate variation in the volume of the fluid container in response to the input signal, thereby optimally attenuating fluid noise in a hydraulic system containing the variable side branch.

In another aspect of the present invention the variable volume fluid container is a variable Helmholz resonator.

In yet another aspect of the present invention the variable volume fluid container is a variable Quinke tube.

BRIEF DESCRIPTION OF THE DRAWINGS

For a better understanding of the present invention, reference may be made to the accompanying drawings in which:

FIG. 4 is a diagrammatic representation of a hydraulic system incorporating a fourth embodiment of the present invention;

FIG. 5 is a diagrammatic representation of a hydraulic system incorporating a fifth embodiment of the present invention; and FIG. 6 is a diagrammatic representation of a hydraulic system incorporating a sixth embodiment of the present invention.

BEST MODE FOR CARRYING OUT THE INVENTION

Figure 1:
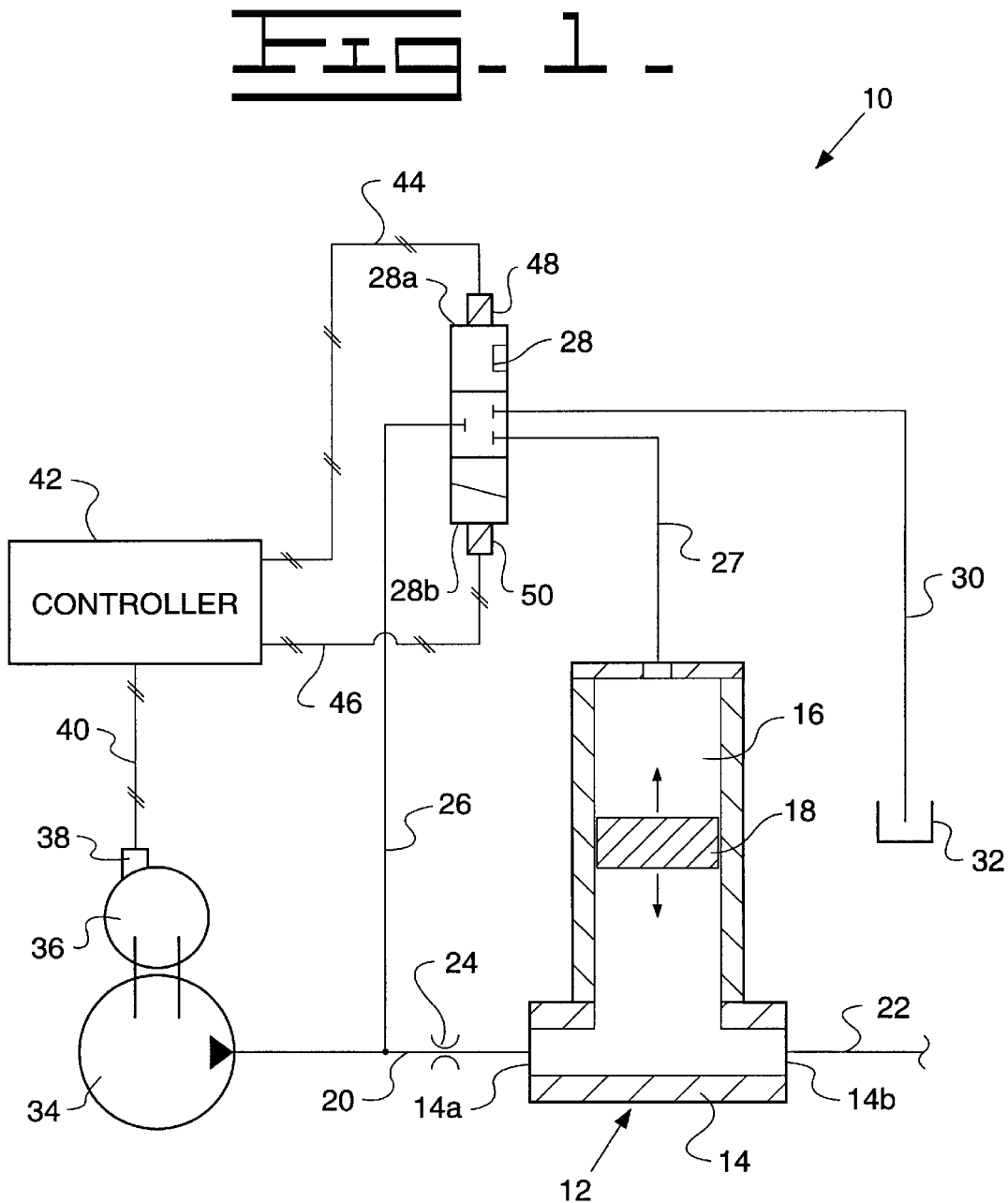
FIG. 1 is a diagrammatic illustration of a hydraulic system embodying a fluid noise attenuator constructed in accordance with the principles of the present invention.

Referring to the drawings, and particularly FIG. 1, numeral 10 indicates, generally, a hydraulic system including a variable Helmholz-type resonator 12 formed in a substantially "T" configuration and having a main flow-through tubular portion 14 intersected by one end of a fluid chamber 16. A piston 18 is housed within chamber 16 and can move in either direction along the length of the chamber. The opposite end of chamber 16 is in fluid communication with a control valve 28 via fluid line 27. Main tubular portion 14 is connected to and receives hydraulic fluid at one end portion thereof, namely, inlet end portion 14a, from fluid line 20 and allows fluid to exit therefrom via fluid line 22 which is connected to the outlet end portion 14b of tubular portion 14.

In-flow of hydraulic fluid into tubular portion 14 is provided through an orifice 24 which is likewise in fluid communication with fluid line 20 and is disposed between hydraulic pump 34 and inlet 14a. Orifice 24 can be selectively variable to control the size thereof. Fluid line 26 branches off of the main fluid line 20 from pump 34 and is in fluid communication with valve 28. Another fluid line 30 is connected to valve 28 and permits exit of hydraulic fluid through valve 28 to a tank 32 as will be hereinafter further explained.

Hydraulic pump 34 provides fluid under pressure to resonator 12 and is operatively connected to and driven by a motor or other motive force 36. A rpm pick-up sensor 38 is operatively coupled to motor 36 and is connected by conductive path 40 to a controller or processor 42. Conductive paths 44 and 46 operatively connect controller 42 to the respective solenoids 48 and 50 associated with valve 28, which solenoids are mounted on opposed ends 28a and 28b of valve 28 and control the operation of such valve.

Controllers, processors or other electronic modules such as controller 42 are commonly used in association with work machines and other vehicles for controlling and accomplishing various functions and tasks including controlling and actuating various valves and other devices associated with one or more hydraulic systems associated with a particular machine. In this regard, controller 42 will typically include processing means such as a microcontroller or microprocessor, associated electronic circuitry such as input/output circuitry, analog circuits or programmed logic arrays, as well as associated memory. Controller 42 can therefore be programmed to sense and recognize appropriate signals from input sensor 38 indicative of certain conditions or parameters such as the speed or rpm of the motor 36, and will thereafter output appropriate signals to control the operation of valve 28 in accordance with the signal received from input sensor 38. Valve 28 functions solely to control the position of piston 18 within fluid chamber 16 so as to control the length and the fluid volume of resonator 12 between piston 18 and tubular portion 14. It is recognized that a piston position sensor could be used to keep track of the piston location. Such position sensors could be known magneto restrictive, LVDT, or optical encoder types or could be done by measuring the flow of fluid into and out of the upper chamber.

The operation of valve 28 is as follows. When control valve 28 is in its centered position, as shown in FIG. 1, valve 28 is closed and no fluid flow from pump 34 via fluid line 26 will be communicated to chamber 16. When the appropriate signal from controller 42 is communicated to solenoid 50, valve 28 will move to a position represented by the bottom portion of valve 28 in FIG. 1 and fluid flow from pump 34 will flow through valve 28 in accordance with the flow path indicated via fluid line 27 to chamber 16 thereby causing piston 18 to move downwardly within such chamber. The amount of downward movement of piston 18 within chamber 16 is dependent upon the amount of hydraulic fluid allowed to enter chamber 16 above piston 18 and such amount is controlled by and programmed into controller 42 based upon the speed or rpm of motor 36. This programming can be accomplished through a wide variety of means including through the use of look up tables, speed charts or other correlated data. As piston 18 is moved downwardly within chamber 16, the fluid volume between piston 18 and tubular portion 14 changes and consequently the volume length changes and such volume can be selected, through appropriate programming of controller 42, based upon the input signal received from sensor 38 to achieve optimum fluid noise control based upon the operation of hydraulic pump 34. Controller 42 will be programmed to allow the appropriate amount of hydraulic fluid to enter chamber 16 to establish the optimum resonator volume for the particular fluid flow involved.

Figure 2:
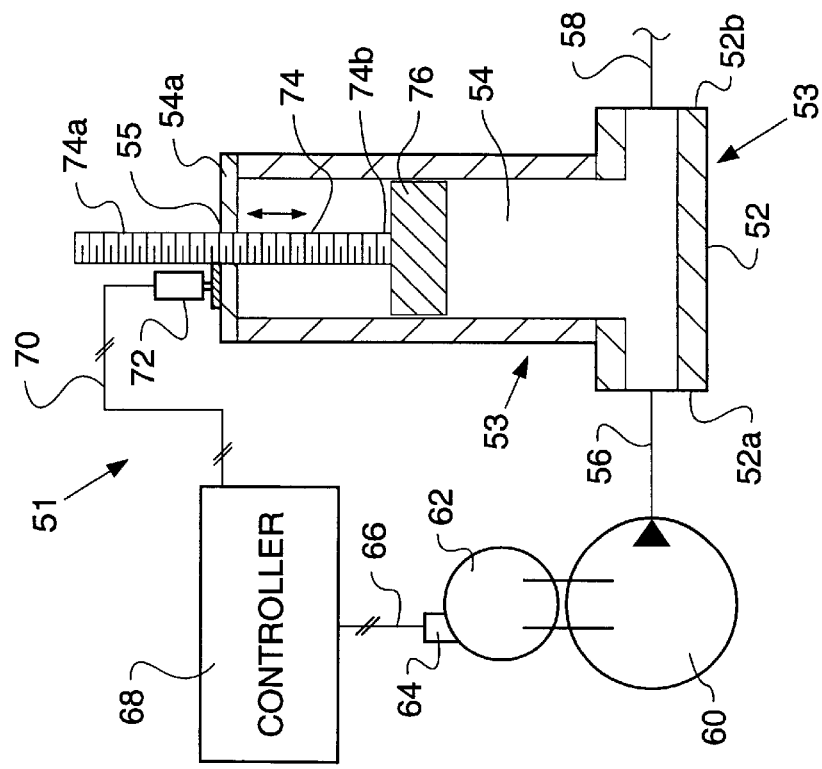
FIG. 2 is a diagrammatic representation of a hydraulic system incorporating another embodiment of the present invention.

If, on the other hand, controller 42 outputs an appropriate signal via conductive path 44 to solenoid 48, valve 28 will move to a position represented by the top portion of valve 28 in FIG. 2 and fluid flow from within chamber 16 above piston 18 will be allowed to flow via fluid lines 27 and 30 to tank 32. This will allow piston 18 to move upwardly within chamber 16 thereby increasing the volume and length of resonator 12 between piston 18 and tubular portion 14. Here again, controller 42, through appropriate programming, will allow the appropriate amount of fluid to exit chamber 16 above piston 18 based upon the input signal received from sensor 38.

As a result, based upon the speed or rpm of motor 36, controller 42 will sense the speed of such motor via conductive path 40 and will output an appropriate signal via either conductive path 44 or 46 to valve 28 to control the movement of piston 18 within chamber 16. Because the position of piston 18 will determine the effective volume and length of the resonator chamber located between piston 18 and tubular portion 14, and because this volume and its effective length controls the noise attenuation frequency, and the piston position varies with the hydraulic pump speed, noise attenuation is always at an ideal setting for the pump speed of system 10. Optimum fluid noise control is therefore achieved.

FIG. 2 illustrates another aspect of the present invention wherein the number 51 generally designates another embodiment of a hydraulic system constructed in accordance with the teachings of the present invention. Unlike embodiment 10 described above which uses fluid to move piston 18, the embodiment of FIG. 2 (and that of FIG. 3) uses a mechanical connection to move the piston in the chamber of resonator 53. In system 51, the main tubular resonator portion 52 is connected in a T-configuration to a fluid chamber 54 and has connected at opposite ends 52a and 52b, inlet line 56 and outlet line 58 respectively.

The opposite end of fluid line 56 is connected to a hydraulic pump 60 which is operatively connected to motor 62. Mounted to motor 62 is a rpm pick-up sensor 64 which is again operatively connected to controller 68 via conductive path 66. Controller 68, in turn, is operatively connected via conductive path 70 to an actuator 72 which is operably connected and/or coupled to one end portion 74a of a threaded rod or shaft 74, the rod 74 being disposed longitudinally and centrally within chamber 54. Rod end 74a extends externally from end wall 54a of chamber 54 adjacent to and in contact with actuator 72 such that operation of actuator 72 will control movement of the rod up and down within chamber 54. This can be accomplished in a wide variety of conventional means such as by having actuator 72 turn a gear or other member which cooperatively engages threaded rod 74 and rotates the rod in one direction or the other. The opposite end portion 74b of threaded rod 74 is fixed to a piston 76 so that piston 76 moves longitudinally within chamber 54, in either direction, as rod 74 moves relative to the top portion or end wall 54a associated with resonator chamber 54. In this regard, chamber end wall 54a includes a threaded opening 55 for threadedly engaging rod 74. The position of the piston can be closely monitored by various known methods.

In system 51, the operation of the hydraulic pump 60, the motor or motive force 62, the sensor 64 and the controller 68 are substantially similar to the operation of these components as explained in system 10 illustrated in FIG. 1. Likewise, based upon the speed or rpm of motor 62, controller 68 will output an appropriate signal to actuator 72 to engage rod 74 so as to move the piston 76 within chamber 74 to control the fluid volume and length of the chamber thereof. In this regard, based upon the input signal from sensor 64, controller 68 will output an appropriate signal, based upon programming as previously explained, to move piston 76, either up or down, to establish an appropriate volume and length to attenuate fluid noise within the system. Once sensor 64 detects the operative speed of motor 62, it inputs an appropriate signal to controller 68 via conductive path 66 and, based upon this sensed condition, controller 68 will output the appropriate signal to actuator 72 via conductive path 70. This signal will actuate actuator 72 and cause rod 74 to either raise or lower the piston 76, the direction of movement of piston 76 being dependent upon the signal from controller 68. Here again, the position of piston 76 determines the volume of the resonator chamber 54 and thereby determines the attenuation frequency. Variation of the speed of the motor 62 necessarily varies the position of piston 76 so that attenuation is always at an optimum setting for the particular pump speed involved. Optimum fluid noise control is therefor again achieved.

Figure 3:
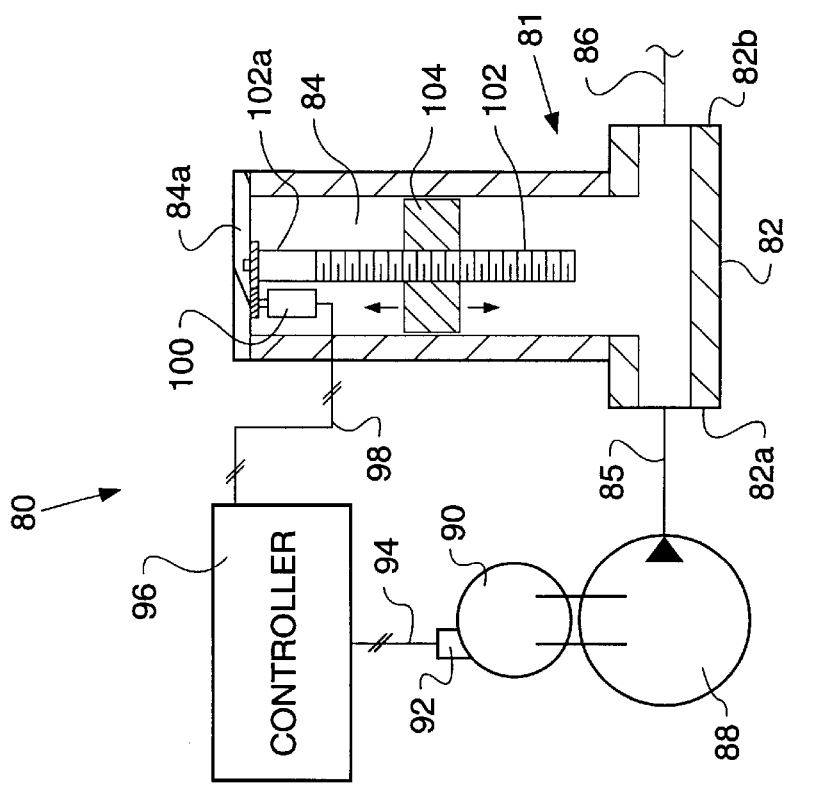
FIG. 3 is a diagrammatic representation of a hydraulic system incorporating a third embodiment of the present invention.

A third embodiment of the present invention is illustrated in FIG. 3 wherein the hydraulic system, generally designated 80, also includes a variable Helmholz resonator 81. Like hydraulic system 51, system 80 includes a tubular resonator portion 82 meeting at a T-intersection with a chamber 84. Fluid line 85 couples a hydraulic pump 88 to an inlet end 82a of tubular resonator portion 82, and fluid line 86 couples outlet end 82b of tubular portion 82 to the remaining system.

As in the other embodiments, pump 88 is operatively connected to motor 90 which has a rpm pickup sensor 92 associated therewith. Pickup sensor 92 transmits a motor speed signal via conductive path 94 to controller 96 and based upon this sensed signal, controller 96 will output an appropriate signal via conductive path 98 to an actuator 100 to control movement of the piston 104 within resonator chamber 84. Here again, the operation of sensor 92 and controller 96 is substantially identical to the operation of sensors 38 and 64 and controllers 42 and 68 previously explained.

In system 80, actuator 100 is mounted within chamber 84 adjacent end wall 84a and is operatively connected to one end 102a of a rod or shaft 102, for example, by an arrangement of gears as illustrated, to thereby cause rotation of rod 102 in either a clockwise or counter clockwise direction depending upon the signal received from controller 96. The main body of rod 102 is threaded and penetrates the piston 104 via a threaded through-hole or opening within the piston. The piston 104 is restrained from rotating with the rod 102 via conventional means such that rotation of the rod 102 will cause piston 104 to move longitudinally within chamber 84 on rod 102 either toward or away from tubular portion 82, depending upon the direction of rotation of rod 102.

Thus, while in system 51 rod 74 moves longitudinally within the chamber and the piston 76 is fixed to the rod 74, the rotatable rod 102 of system 80 remains longitudinally fixed within its respective chamber 84. In system 80, like system 51, the position of the piston determines the effective volume and length of the Helmholz resonator and this volume, based upon the speed of hydraulic pump 88, determines the noise attenuation frequency. Likewise the position of the piston can be monitored as set forth with previous embodiments.

FIG. 4 illustrates a fourth embodiment of the present invention wherein the hydraulic system 110 again includes a variable Helmholz resonator 111 having a main tubular portion and a fluid chamber connected thereto in a T configuration, the variable volume of the resonator chamber being accomplished through the use of a movable end cap instead of an internal piston. More specifically, a main tubular portion 112 is connected at a T-shaped intersection to a fluid chamber 114 which is closed at the end opposite the T intersection with a movable end cap 116. End cap 116 is necessarily fluid-tight in its relationship to chamber 114, but is movable longitudinally thereon, preferably via a "rack and pinion" mechanism, generally designated 118, which connects end cap 116 to an actuator 120.

Similar to the other embodiments of the present invention, tubular portion 112 has an inlet end 112a connected in fluid communication to a fluid inlet line 122 and an opposed outlet end 112b connected in fluid communication to an outlet line 124. Fluid inlet line 122 is in fluid communication with hydraulic pump 126 which is operatively connected to a motor 128 having a rpm pickup or other speed sensor 130 associated therewith. Sensor 130 transmits motor speed data via conductive path 132 to a controller 134 which, in turn, outputs a signal to actuator 120 via conductive path 136 to either raise or lower the end cap 116, depending upon the signal. Movement of end cap 116 either increases or decreases the volume and length of chamber 114. The operation of sensor 130 and controller 134 is as previously explained with respect to sensors 38, 64 and 94, and controllers 42,68 and 96.

Actuator 120 is fixed in position so that end cap 116 is caused to move up or down when rack and pinion mechanism 118 is activated. The position of end cap 116 determines the volume and length of the Helmholz resonator (elements 112, 114 and 116) and so controls the attenuation frequency. Because the position of end cap 116 varies with the speed of motor 128, attenuation is always optimized for pump speed.

FIG. 5 illustrates a fifth embodiment of the present invention in which number 140 generally designates a hydraulic system having a Quinke tube arrangement as a side branch, rather than a Helmholz resonator. System 140 includes a substantially U=shaped tube 142 having an arcuate central portion 142c which extends in opposite directions and terminates in paired parallel straight end portions 142a and 142b. Tube end portion 142a is slidably received, in fluid-tight sleeved fashion, in a substantially straight tube 144 and tube end portion 142b is likewise slidably received, in fluid-tight sleeved fashion, in a substantially straight tube 146.

Straight tube 144 has an inlet port 144a and an outlet port 144b, preferably disposed at a right angle to inlet port 144a, and straight tube 146 has an inlet port 146a and an outlet port 146b, also preferably (although not necessarily) arranged at right angles to one another. A fluid line 148 connects outlet port 144b to inlet port 146a at its opposed ends 148a and 148b respectively. The outlet port 146b of tube 146 is in fluid communication with an outlet line 150 and the inlet port 144a of tube 144 is in fluid communication with a pump 152 via an inlet line 154. When fluid flow enters inlet portion 144a, flow is divided between tubes 142 and 148 in accordance with the normal operation of a Quinke tube configuration.

As in the previous embodiments, pump 152 is operatively connected to a motor 156 having a rpm pickup sensor 158 connected thereto. Sensor 158 communicates motor speed via conductive path 160 to a controller 162 which, in turn, outputs a signal via conductive path 164 to an actuator 166. As is the case with the second, third and fourth embodiments of the present invention described above, in this embodiment it is recognized that the actuator 166 can be any of a number of suitable devices, such as, but not limited to, stepper motors, servos, electric motors with position feedback, or hydraulic motors with position feedback.

Actuator 166 is fixed in its position and includes a rotatable gear 168 which is operatively engageable with a threaded portion 170 of a rod or shaft 172. Rod 172 has one end portion 172a fixed or otherwise coupled to the inside of the curved portion 142c of tube 142 such that movement of rod 172 will cause movement of the U-shaped tube 142 up or down within tubes 144 and 146. When controller 162 outputs an appropriate signal to actuator 166 based upon an appropriate input from speed sensor 158, gear 168 will rotate, either clockwise or counterclockwise, depending upon the signal, causing movement of rod 172 between and substantially parallel to tube ends 142a and 142b. As rod 172 moves up or down, tube 142 moves likewise, causing ends 142a and 142b to move in tubes 144 and 146 respectively, thus varying the distance of fluid travel through tubes 144 and 146. This change in distance traveled by the fluid results in changing the volume and length of the side branch of system 140. Since the length of line 148 is different from the combined lengths of tubes 142, 144, and 146, the pressure ripples in the hydraulic fluid passing through the two paths are out of phase when they meet and recombine at the intersection of tubes 146a and 146b. Further, because the position of curved tube 142 varies with pump speed, the attenuation is always optimized for pump speed and fluid noise is thereby minimized.

FIG. 6 illustrates still another, sixth, embodiment of the present invention in which the branch tube has a pressure balanced plug associated therewith for controlling and changing the volume of the fluid chamber used to attenuate fluid noise in the system. Number 180 in FIG. 6 generally designates a hydraulic system in which a main tubular portion 182 of resonator 181 intersects in a T configuration with a fluid chamber 184. Tubular portion 182 includes an inlet end 182a which is in fluid communication with an inlet line 186 and an outlet end 182b which is in fluid communication with an outlet line 188.

Inlet line 186 communicates with a pump 190 and a further fluid line 192 which intersects at one end thereof with line 186 between pump 190 and inlet end 182a. The opposite end of fluid line 192 connects via a feed tube 194 to the end wall 184a of chamber 184 and thereby permits entry of hydraulic fluid into the upper portion of the chamber above the plug 196, described hereafter, to balance the fluid pressure exerted on one side of the plug with the fluid pressure being exerted on the opposite side of the plug.

Chamber 184 has a threaded internal wall 184b which threadedly engages the correspondingly threaded plug 196 as shown in FIG. 6. An electrical stepper motor 198 is mounted on plug 196 and is operatively connected to a friction drive wheel 197 which is positioned in pressing contact with the threaded internal wall 184*b* of the chamber. The reaction torque from the drive wheel 197 causes the stepper motor 198 and the plug 196 to rotate. Rotation of drive wheel 197 thereby causes plug 196 to move either up or down within the chamber and thereby varies the volume and length of the chamber, depending upon the signal received via lead wire 200. The position of the piston can be monitored as set forth with previous embodiments.

Lead wire 200 is connected by conductive path 201 to a controller 202 which, in turn, is operatively connected to a rpm pickup sensor 204 on pump motor 206 via conductive path 203. Motor 206 operates or drives hydraulic pump 190 as previously explained. In this regard, the operation of controller 202 and sensor 204 to control movement of the plug 196 in response to the operation of stepper motor 198 is substantially similar to the operation of the sensors and controllers previously described with the other embodiments of the present invention described above. Lead wire 200 is sufficiently long to permit plug 196 to travel to the bottom of chamber 184, but is prevented from becoming tangled in the friction drive wheel through the use of a guard or cover 199 positioned around the wheel 197. At the bottom of chamber 184 there is formed an inwardly directed lip 208 which keeps plug 196 from traveling past lip 208 into the flow path of tubular portion 182. It is recognized and anticipated that other forms of stop mechanisms may likewise be used in place of the lip 208.

In system 180, because feed tube 194 allows free flow of pressurized fluid to enter the chamber 184 both above and below the plug 196, regardless of the position of the plug 196 within the chamber 184, hydraulic fluid pressure is equal on both sides of plug 196. Also, since the area exposed to the fluid pressure on both sides of the plug 196 is likewise equal, stepper motor 198 has only to overcome the force of the resistance of the threaded interaction between plug 196 and inner chamber wall 184*b*. Accordingly, in this embodiment of the present invention, a motor such as stepper motor 198 having a lower power output as compared to the power output requirements associated with the actuator/motors of the above discussed embodiment can be used.

Industrial Applicability

As has been demonstrated above, a side branch adaptation to a hydraulic pumping system, which branch can be varied in volume or length as pump speed increases and decreases, provides high attenuation of fluid-borne noise over a broad band and thus provides better attenuation in a wider variety of situations. Accordingly, the present invention provides a substantial useful improvement over known noise attenuated hydraulic pumping systems.

In each of the above-described embodiments of the present invention, the controller, microprocessor, or the like, can receive signals from various system parameters and can process the various system parameters to produce the electrical signal that controls either the piston or plug position in the present fluid resonator chamber, or the length of the Quinke tube as illustrated in FIG. 6. The capability with the described hydraulic systems to vary the fluid volume and length in the side branch permits automatic attenuation of flow ripples and thereby minimizes fluid noise. The described system also permit the operator to selectively engage and disengage the variable volume side branch, if desired.

The various system examples shown above illustrate the great flexibility of the present hydraulic noise reduction assembly. A user of the present invention may choose any of the above systems, or an equivalent thereof, depending upon the desired application. In this regard, it is recognized that various forms of the subject systems for the attenuation of fluid borne noise could be utilized without departing from the essence of the invention. As is evident from the foregoing description, certain aspects of the present invention are not limited by the particular details of the examples illustrated herein, and it is therefore contemplated that other modifications and applications will occur to those skilled in art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A variable volume side branch for attenuating fluid noise in a hydraulic system having a fluid pump, the side branch comprising:

a variable volume fluid container having a fluid inlet and a fluid outlet, the fluid container being operable to change the effective volumetric length thereof in response to changes in fluid pump speed, the fluid inlet of the variable volume fluid container being in fluid communication with a fluid pump;

a speed sensor operable to determine fluid pump speed and to transmit a signal indicative of fluid pump speed; and a controller coupled to the speed sensor and operable to receive an input signal from the speed sensor and to output an appropriate signal to initiate variation in the volumetric length of the fluid container in response to the input signal, said controller controlling the volumetric length of the fluid container to thereby optimally attenuate fluid noise in a hydraulic system containing the variable side branch.

2. The variable volume side branch as set forth in claim 1 wherein the variable volume fluid container is a variable Helmholz resonator having a tubular portion and a fluid chamber intersecting with the tubular portion, and wherein the fluid container inlet and the fluid container outlet are disposed at opposite ends of the tubular portion.

3. The variable volume side branch as set forth in claim 2 further comprising a piston within the fluid chamber, the piston being capable of moving longitudinally within the fluid chamber in response to the signal outputted from said controller to thereby vary the volumetric length of the fluid container.

4. The variable volume side branch as set forth in claim 3 further comprising a valve coupled to the controller and in fluid communication with the fluid pump and with the fluid chamber, the valve being operable to receive signals from the controller to initiate fluid flow into and out of the fluid chamber, operation of the valve causing longitudinal movement of the piston within the chamber to thereby vary the volumetric length of the fluid container.

5. The variable volume side branch as set forth in claim 3 further comprising:

a threaded rod having a first end and a second end, the first end of the threaded rod being fixed to the piston; and an actuator positioned and located so as to cooperatively engage the second end of the threaded rod, the actuator being coupled to the controller and operable to receive a signal therefrom to cause movement of the threaded rod, movement of the threaded rod in response to the signal outputted from said controller causing the piston to move longitudinally within the fluid chamber to change the volumetric length thereof.

6. The variable volume side branch as set forth in claim 3 wherein the piston includes a longitudinally disposed through-hole, the side branch further comprising:

a threaded rod having a first end and a second end, the first end of the threaded rod being threadedly engaged with the through-hole of the piston; and an actuator positioned and located so as to cooperatively engage the second end of the threaded rod, the actuator being coupled to the controller and operable to receive a signal therefrom to cause rotation of the threaded rod, rotation of the threaded rod in response to the signal outputted from said controller causing movement of the piston within the fluid chamber to change the volumetric length thereof.

7. The variable volume side branch as set forth in claim 2 wherein the fluid chamber includes an end cap movably mounted to the end of the fluid chamber opposite the tubular portion, the side branch further comprising:

an actuator coupled to the controller and engageable with the end cap, the actuator being operable to receive a signal from the controller and to actuate movement of the end cap relative to the fluid chamber, movement of the end cap in response to the signal outputted from the controller causing the volumetric length of the fluid chamber to change.

8. The variable volume side branch as set forth in claim 7 wherein the actuator comprises a rack and pinion mechanism connected to the end cap.

9. The variable volume side branch as set forth in claim 3 wherein the piston is a plug having external threads and the fluid chamber has an internal wall which is correspondingly threaded for threaded engagement with the plug, the side branch further comprising:

a stepper motor mounted to the plug and coupled to the controller, the stepper motor being operable to receive a signal from the controller; and a friction drive wheel connected to the stepper motor and in movable contact with the internal wall of the fluid chamber to cause the plug to move in response to the signal outputted from the controller to the stepper motor, movement of the friction drive wheel causing the volumetric length of the fluid chamber to change.

10. The variable volume side branch as set forth in claim 1 wherein the variable volumetric length fluid chamber is a variable Quinke tube.

11. The variable volume side branch as set forth in claim 10 wherein the variable Quinke tube comprises:

a substantially U-shaped tubular member having a central curved portion and a first substantially straight end portion and a second substantially straight end portion extending from opposite sides of the central curved portion;

first and second tubular sleeve members adapted for slidably receiving the first and second substantially straight end portions of said substantially U-shaped tubular member, the first and second tubular sleeve members being in fluid communication with one another, the first tubular sleeve member having an inlet in fluid communication with the fluid pump and the second tube sleeve member having a fluid outlet; and a rod fixed centrally to and extending longitudinally from the central curved portion of said tubular member substantially parallel to the first and second substantially straight end portions;

the side branch further comprising an actuator coupled to the controller and engageable with the rod, the actuator being operable to receive a signal from the controller and to initiate longitudinal movement of the rod upon receipt of the signal, movement of the rod causing the volumetric length of the Quinke tube to change.

12. The variable volume side branch as set forth in claim 1 further comprising an actuator connected to the variable volume fluid container, the actuator being coupled to the controller and being operable to receive a signal therefrom, said actuator being further operable to change the volumetric length of the fluid container in response to the signal outputted from the controller.

13. A hydraulic system for attenuating fluid noise in the system, the system comprising:

a variable volume side branch including a variable volume fluid container having a fluid inlet and a fluid outlet, the fluid container being operable to change the volumetric length thereof;

a fluid pump operatively connected to and in fluid communication with the fluid inlet of the variable volume fluid container;

a motor operable to drive the fluid pump;

a sensor operable to determine fluid pump speed and to transmit a signal indicative of fluid pump speed;

a controller coupled to the sensor and operable to receive an input signal from the sensor and to output an appropriate signal to change the volumetric length of the fluid container in response to the input signal; and an actuator coupled to the controller and operable to receive a signal therefrom, said actuator being further operable to change the volume of the fluid container in response to the signal outputted from said controller to optimally attenuate fluid noise in the hydraulic system.

14. The system as set forth in claim 13 wherein the variable volume fluid container is a variable Helmholz resonator having a tubular portion and a fluid chamber, and wherein the fluid container inlet and the fluid container outlet are disposed at opposite ends of the tubular portion.

15. The system as set forth in claim 14 further comprising a piston within the fluid chamber, the piston being capable of moving longitudinally within the fluid chamber in response to the signal outputted from said controller to thereby vary the volumetric length of the fluid container.

16. The system as set froth in claim 15 further comprising a valve coupled to the controller and in fluid communication with the fluid pump and with the fluid chamber, the valve being operable to receive signals from the controller to initiate fluid flow into and out of the fluid chamber, operation of the valve causing longitudinal movement of the piston within the chamber to thereby vary the volumetric of the fluid container.

17. The system as set forth in claim 15 further comprising a threaded rod having a first end and a second end, the first end of the threaded rod being fixed to the piston, the actuator being positioned and located so as to cooperatively engage the second end of the threaded rod, the actuator being operable in response to the signal outputted from said controller to cause movement of the threaded rod, movement of the threaded rod causing the piston to move longitudinally within the fluid chamber to change the volume thereof.

18. The system as set forth in claim 15 wherein the piston includes a longitudinally disposed through-hole, the system further comprising:

a threaded rod having a first end and a second end, the first end of the threaded rod being threadedly engaged with the through-hole of the piston;

the actuator being positioned and located so as to cooperatively engage the second end of the threaded rod, the actuator being operable in response to the signal outputted from said controller to cause rotation of the threaded rod, rotation of the threaded rod causing movement of the piston within the fluid chamber, to change the volumetric length thereof.

19. The system as set forth in claim 15 wherein the fluid chamber includes an end cap movably mounted to the end of the fluid chamber opposite the tubular portion, the actuator being positioned and located so as to be engageable with the end cap, the actuator being operable in response to the signal outputted from the controller to cause longitudinal movement of the end cap relative to the fluid chamber, movement of the end cap causing the volumetric of the fluid chamber to change.

20. The system as set forth in claim 15 wherein the piston is a plug having external threads and the fluid chamber has an internal wall which is correspondingly threaded for threaded engagement with the plug, and wherein the actuator is a stepper motor mounted to the plug and coupled to the controller, the stepper motor being operable to receive a signal from the controller, the system further including a friction drive wheel connected to the stepper motor and in movable contact with the internal wall of the fluid chamber to cause the plug to move in response to the signal outputted from the controller to the stepper motor, movement of the friction drive wheel causing the volumetric of the fluid chamber to change.

21. The system as set forth in claim 13 wherein the variable volume fluid container is a variable Quinke tube.

22. The system as set forth in claim 21 wherein the variable Quinke tube comprises:

a substantially U-shaped tubular member having a central curved portion and a first substantially straight end portion and a second substantially straight end portion extending from opposite sides of the central curved portion;

first and second tubular sleeve members adapted for slidably receiving the first and second substantially straight end portions of said substantially U-shaped tubular member, the first and second tubular sleeve members being in fluid communication with one another, the first tubular sleeve member having an inlet in fluid communication with the fluid pump and the second tube sleeve member having a fluid outlet; and a rod fixed centrally to and extending longitudinally from the central curved portion of said tubular member substantially parallel to the first and second substantially straight end portions;

the actuator being positioned and located so as to be engageable with the rod, the actuator being operable in response to the signal outputted from said controller to initiate longitudinal movement of the rod, movement of the rod causing the volumetric of the Quinke tube to change.

* * * * *